United States Patent [19]

Janssen

[11] 3,852,458
[45] Dec. 3, 1974

[54] ANTIDEPRESSIVE ACTIVITY OF TETRAMISOLE
[75] Inventor: Paul Adriaan Jan Janssen, Vosselaar, Belgium
[73] Assignee: Janssen Pharmaceutical N.V., Beerse, Belgium
[22] Filed: July 11, 1973
[21] Appl. No.: 378,306

[52] U.S. Cl. ................................................ 424/270
[51] Int. Cl............................................ A61k 27/00
[58] Field of Search ..................................... 424/270

[56] References Cited
UNITED STATES PATENTS
3,274,209   9/1966   Raeymaekers et al.............. 424/270

Primary Examiner—Stanley J. Friedman
Attorney, Agent, or Firm—Salvatore R. Conte

[57] ABSTRACT

The anti-depressant activity of 2,3,5,6-tetrahydro-6-phenylimidazo[2,1-b]thiazole and acid addition salts thereof.

5 Claims, No Drawings

ANTIDEPRESSIVE ACTIVITY OF TETRAMISOLE

This invention relates to the use of an imidazo-thiazole-derivative as an anti-depressant agent and to pharmaceutical compositions thereof, preferably in dosage unit form.

The particular imidazo-thiazole so utilized is 2,3,5,6-tetrahydro-6-phenylimidazo[2,1-b]thiazole, which can be represented by the following formula:

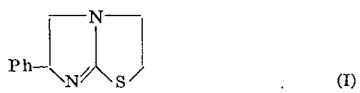
(I)

whether in the form of a racemate (due to the presence of the asymmetric carbon atom bearing the phenyl substituent), or in the form of the resolved levo- and dextro-enantiomorphs, and the therapeutically active acid addition salts thereof.

Said 2,3,5,6-tetrahydro-6-phenylimidazo[2,1-b]thiazole is a reported anthelmintic (see U.S. Pat. No. 3,274,209), the racemic form being known as "tetramisole" and the levo-isomer as "levamisole. The dextro-isomer is denoted as "dextro-tetramisole."

In preparing the acid addition salts of (I), either inorganic or organic acids may be employed. The acid employed is desirably one of which is non-toxic to animals or humans at the dosage employed. Among such inorganic acids which may be employed herein are, for example, hydrochloric, hydrobromic, sulfuric, nitric, phosphoric and the like acids. the hydrochloric acid addition salt is preferred. Among such organic acids which may be employed herein are, for example, fumaric, benzoic, acetic, propionic, lactic, hexamic, benzene sulfonic, ascorbic, nicotinic, gallic, citric, salicylic, phthalic and the like acids. The acid addition salts contemplated for use in the present invention may be prepared by reacting the base (I) with the corresponding inorganic and organic acid.

It has now been found that racemic, dextro, and levo 2,3,5,6-tetrahydro-6-phenylimidazo[2,1-b]thiazole and the acid addition salts thereof possess antidepressant activity. Without being bound to any particular theory of action, it appears that said antidepressant activity is mediated through an effect on the central nervous system (CNS) to enhance mood by relieving depression. The anti-depressant activity of the subject compounds has been observed in experimental laboratory animals and in humans, as demonstrated hereinafter. Said compounds and therapeutic compositions containing same are therefore useful in the treatment of depression when administered to depressed subjects. Human tests conducted with the compounds, compositions and process herein described have provided significant relief from mental depression and a feeling of well-being in the patients.

It has been unexpected to observe that the dextroisomer of 2,3,5,6-tetrahydro-6-phenylimidazo[2,1-b]thiazole, the preferred form of (I), possesses a better anti-depressant activity than the levo-isomer. Accordingly, the compositions and process of this invention preferably employ the dextroisomer.

By virtue, therefore, of the ability of 2,3,5,6-tetrahydro-6-phenylimidazo[2,1-b]thiazole and its acid addition salts, the therapeutic compositions containing them, and the process of the invention to demonstrate anti-depressant properties, a useful tool is provided whereby a marked benefit is obtained in the treatment of mental disorders in human beings.

The process aspect of this invention comprises the method of inhibiting depression by internally administering to a depressed mammal, particularly humans, an effective antidepressant amount of 2,3,5,6-tetrahydro-6-phenylimidazo[2,1-b]-thiazole or a therapeutically active, non-toxic, acid addition salt thereof. Preferably, the active ingredient is intimately admixed with a pharmaceutically acceptable carrier in dosage unit forms for ease of administration and uniformity of dosage, each unitary dosage containing a predetermined quantity of active ingredient calculated to produce the desired therapeutic effect in assoication with the required pharmaceutical carrier. The amount of active ingredient per dosage unit may range from about 5 mg to about 500 mg, and preferably, from about 5 mg to about 250 mg. In an effective embodiment of the invention, the subject compounds are administered to an adult human at a dose level ranging from about 50 to about 500 mg daily (based on weight of base).

The following examples are intended to illustrate, but not limit, the scope of the present invention.

EXAMPLE I

By means of a tetrabenazine-like substance, benzoquinolizine (10 mg/kg s.c.) symptoms of palpebral ptosis, sedation, miosis and hypothermia are induced in mice. Substances with antidepressant properties are Table 1

| Dose mg/kg | MICE | | | | | | | | | | | |
|---|---|---|---|---|---|---|---|---|---|---|---|---|
| | Tetramisole | | | | Imipramine | | | | Tranylcypromine | | | |
| | PP | SE | MI | HY | PP | SE | MI | HY | PP | SE | MI | Hy |
| 0.31 | 0 | 0 | 0 | 0 | 0 | 0 | 0 | 0 | 0 | 0 | 0 | 0 |
| 0.63 | 0 | 0 | 0 | 0 | 0 | 0 | 0 | 0 | ++ | 0 | 0 | 0 |
| 1.25 | 0 | 0 | 0 | 0 | ++ | 0 | 0 | 0 | ++ | 0 | 0 | 0 |
| 2.50 | 0 | 0 | 0 | 0 | ++ | 0 | + | 0 | +++ | ++ | + | + |
| 5.00 | 0 | 0 | 0 | 0 | ++ | 0 | + | + | +++ | ++ | + | + |
| 10.0 | ++ | 0 | 0 | + | +++ | 0 | + | + | +++ | +++ | ++ | +++ |
| 20.0 | ++ | 0 | 0 | + | ++ | 0 | + | + | +++ | +++ | + | +++ |
| 40.0 | ++ | ++ | 0 | + | ++ | − | ++ | + | +++ | +++ | ++ | +++ |

PP = Palpebral ptosis  
SE = Sedation  
MI = Miosis  
HY = Hypothermia  
0 means no  
+ means mild  
++ means potent         Statistical antagonism  
+++ means very potent known to antagonize these symptoms. Fifteen minutes before the administration of the benzoquinolizine, the compound to be tested for antidepressant activity is administered, and 15, 30 and 60 minutes after the administration of the benzoquinolizine, the aforementioned symptoms are observed and compared with the symptoms of control animals that have not been treated with the test compound. In Table 1 the results of this comparison are presented for varying dosages of imipramine and tranylcypromine, which two substances are known to possess antidepressant activity, and dl-2,3,5,6-tetrahydro-6-phenylimidazo[2,1-b]thiazole hydrochloride (tetramisole), which possesses antidepressant activity according to this invention. The dosages are administered s.c. and tabulated in terms of mg/kg body weight of the animal. From the results it can be concluded that tetramisole has a similar effect as imipramine on some symptoms induced by benzoquinolizine. Tetramisole thus antagonizes palpebral ptosis and hypothermia at a dose of 10 mg/kg s.c. At a dose of 40 mg/kg sedation is reversed. Tetramisole has no effect on miosis. The data in Table 1 relate to the maximum effect observed at the aforementioned 15, 30 or 60 minute time periods.

Tetramisole, imipramine and tranylcypromine are administered in various doses s.c. in rats, simultaneously with amphetamine (5 mg/kg i.v.), which induces symptoms such as stereotypies, agitation and exophthalmia. Five minutes and three hundred minutes after the administration of the amphetamine and the substance possessing antidepressant activity, said symptoms are checked. The prolongation of these symptoms are compared with the control rats that have only been treated with amphetamine and not with the substance possessing antidepressant properties, in recorded. The result of this comparison is presented in the following Table 2. The data relates to the maximum effect observed at the aforementioned 5 or 300 minute time periods.

Table 2

RATS

| Dose mg/kg | Tetramisole | | | Imipramine | | | Tranylcypromine | | |
|---|---|---|---|---|---|---|---|---|---|
| | ST | AG | EX | ST | AG | EX | ST | AG | EX |
| 0.31 | 0 | 0 | 0 | 0 | 0 | 0 | 0 | 0 | 0 |
| 0.63 | 0 | 0 | 0 | + | 0 | (+) | 0 | 0 | 0 |
| 1.25 | 0 | 0 | 0 | + | 0 | (+) | + | 0 | (+) |
| 2.50 | + | + | 0 | ++ | ++ | + | + | + | (+) |
| 5.00 | + | + | 0 | ++ | ++ | + | | toxic | |
| 10.0 | + | ++ | 0 | ++ | ++ | ++ | | do. | |
| 20.0 | + | + | (+) | ++ | ++ | − | | do. | |

ST = stereotypies
AG = agitation
EX = exophthalmia
0 means no prolongation of the symptoms
+ means moderate prolongation of the symptoms
++ means marked prolongation of the symptoms From the results it can be concluded that the effect of tetramisole on some symptoms is similar to that of imipramine. The data demonstrate that tetramisole administered s.c. to rats in doses of 2.5 mg or more per kg bodyweight prolongs stereotypies and agitation induced by amphetamine (5 mg/kg i.v.).

Self-stimulating tests in rats with electrodes implanted in the medial forebrain bundle have shown that tetramisole in doses of 10 and 20 mg/kg increased the response ratio at low frequency stimulation (20 pps). The same result was obtained through administration of amphetamine.

EXAMPLE III

The same procedure is followed as in Example I except that 15 minutes before the administration of the benzoquinolizine (10 mg/kg s.c.) to the mouse a dose of dextro-tetramisole or levamisole is administered subcutaneously in terms of mg/kg body weight. From the results of Table 3, it is shown that the dextro-form has better antidepressant properties than the levo-form.

Table 3

MICE

| Dose mg/kg | Dextrotetramisole | | | | Levamisole | | | |
|---|---|---|---|---|---|---|---|---|
| | PP | SE | MI | HY | PP | SE | MI | HY |
| 1.25 | 0 | 0 | 0 | 0 | | | | |
| 2.5 | + | 0 | 0 | 0 | | | | |
| 5 | + | 0 | 0 | + | 0 | 0 | 0 | 0 |
| 10 | ++ | 0 | 0 | + | 0 | 0 | 0 | + |
| 20 | ++ | 0 | + | + | ++ | 0 | 0 | 0 |
| 40 | ++ | ++ | 0 | + | ++ | 0 | 0 | 0 |

EXAMPLE IV

The antidepressant activity of levamisole has also been established during clinical studies in human beings, namely in depressed psychotic patients. Depression was assessed on the Hamilton scale [J. Neurol. Neurosurg. Psychiat., 23, 56 (1960).] for depression as represented in Table 4 below. Concentration was assessed by means of the Grünbaum dynamic concentration test [Rutten, J.W.H.M., Attentiviteit als Psychodiagnosticum, Swets and Zeitlinger, Amsterdam, 1964 ] in which the patient has to arrange randomly given numbers in an increasing or decreasing sequence; reaction time was measured by making the patient put in a key as a response to a light going on.

Levamisole HCl (50 mg tablet, three times daily) did not produce any appreciable effect on concentration. The average time needed to pass the Grünbaum test was 8.96 seconds before and 8.12 seconds during the treatment. Reaction time was not significantly influenced either. The average reaction time was 500.4 milliseconds before and 423.3 milliseconds during the treatment. According to the Hamilton scale however, a marked improvement of the depression was noted within 2 weeks, an even more marked improvement after 4 weeks of treatment.

A minimum dose for levamisole is 50 mg daily for an adult and a maximum dose is 500 mg. The compound is preferably administered in the form of capsules or tablets. As a general rule, the dextro-tetramisole may be administered to humans at a dosage level one-half that of levamisole. For example, 2,3,5,6-tetrahydro-6-phenylimidazo[2,1-b]thiazole or a salt thereof can be administered to adults at a dosage of 50 mg three times daily if the levo-isomer is used or 25 mg three times daily if the dextro-isomer is used (based on weight of base).

Table 4

| No. | Range | Symptoms | Placebo versus Levamisole |
|-----|-------|----------|---------------------------|
| 1 | 0–4 | Depression | ↑↑↑ |
| 2 | 0–4 | Guilt feelings | |
| 3 | 0–4 | Suicidal tendencies | |
| 4 | 0–2 | Insomnia, initial | |
| 5 | 0–2 | Insomnia, middle | |
| 6 | 0–2 | Insomnia, delayed | |
| 7 | 0–4 | Activity and interests | ↑↑ |
| 8 | 0–4 | Motor retardation | |
| 9 | 0–2 | Agitation | ↑↑ |
| 10 | 0–4 | Psychic anxiety | ↑↑ |
| 11 | 0–4 | Somatic anxiety | ↑↑ |
| 12 | 0–2 | Somatic and gastrointestinal symptoms | ↑↑ |
| 13 | 0–2 | Somatic and general symptoms | |
| 14 | 0–2 | Genital symptoms | |
| 15 | 0–4 | Somatic concern | |
| 16 | 0–2 | Loss of insight | |

Rating scale

| | | |
|---|---|---|
| 0–4 | 0 | none |
| | 1 | mild or doubtful |
| | 2 | moderate |
| | 3 | |
| | 4 | severe |
| 0–2 | 0 | none |
| | 1 | mild or doubtful |
| | 2 | marked |

↑↑↑ level of significance <0.001 (Mann-Whitney-U-test).
↑↑ level of significance ≤ 0.01 (Mann-Whitney-U-test).

To prepare the pharmaceutical compositions of this invention, 2,3,5,6-tetrahydro-6-phenylimidazo[2,1-b]thiazole, in base or acid-addition salt form, as the active ingredient is combined in intimate admixture with a pharmaceutically acceptable carrier, which carrier may take a wide variety of forms depending on the form of preparation desired for administration. These pharmaceutical compositions are desirable in unitary dosage form suitable, preferably, for administration orally, rectally or by parenteral injection. For example, in preparing the compositions in oral dosage form, any of the usual pharmaceutical media may be employed, such as, for example, water glycols, oils, alcohols and the like in the case of oral liquid preparations such as suspensions, syrups, elixirs and solutions; or solid carriers such as starches, sugars, kaolin, lubricants, binders, disintegrating agents and the like in the case of powders, pills, capsules and tablets. Because of their ease in administration, tablets and capsules represent the most advantageous oral dosage unit form, in which case solid pharmaceutical carriers are obviously employed. For parenteral compositions, the carrier will usually comprise sterile water, at least in large part, though other ingredients, for example, to aid solubility, may be included. Injectable solutions, for example, may be prepared in which the carrier comprises saline solution, glucose solution or a mixture or saline and glucose solution. Injectable suspensions may also be prepared in which case appropriate liquid carriers, suspending agents and the like may be employed. Acid addition salts of (I), due to their increased water solubility over the corresponding base form, are obviously more suitable in the preparation of aqueous compositions.

It is especially advantageous to formulate the aforementioned pharmaceutical compositions in dosage unit form for ease of administration and uniformity of dosage. Dosage unit form as used in the specification and claims herein refers to physically discrete units suitable as unitary dosages, each unit containing a predetermined quantity of active ingredient calculated to produce the desired therapeutic effect in association with the required pharmaceutical carrier. Examples of such dosage unit forms are tablets (including scored or coated tablets), capsules, pills, powder packets, wafers, injectable solutions or suspensions, teaspoonfuls, tablespoonfuls and the like, and segregated multiples thereof. The amount of active ingredient per dosage unit will be from about 5 mg to about 500 mg, and, preferably, from about 5 mg to about 150 mg.

The following formulations exemplify typical antidepressant pharmaceutical compositions in dosage unit form suitable for administration to depressed subjects in accordance with the instant invention.

Capsules: 10,000 Hard gelatin capsules, each containing as the active ingredient (A.I.) 25 milligrams of dl-2,3,5,6-tetrahydro-6-phenylimidazo[2,1-b]thiazole hydrochloride are prepared from the following formulation:

| | Grams |
|---|---|
| A.I. | 250 |
| Lactose | 750 |
| Starch | 250 |
| Talc | 250 |
| Calcium Stearate | 10 |

A uniform mixture of the active and supplementary ingredients is prepared and filled into two-piece hard gelatin capsules.

Tablets:

5,000 Compressed tablets, each containing as the active ingredient 10 milligrams of dextro-2,3,5,6-tetrahydro-6-phenylimidazo[2,1-b]thiazole hydrochloride are prepared from the following formulation:

| | Grams |
|---|---|
| A.I | 50 |

-Continued

| | Grams |
|---|---|
| Starch | 75 |
| Dibasic Calcium phosphate hydrous | 500 |
| Calcium Stearate | 2.5 |

The finely powdered ingredients are mixed well and granulated with 10% starch paste. The granulation is dried and compressed into tablets using starch as a disintegrant and calcium stearate as a lubricant.

Oral Suspension

The following formulaton provides 5 liters of an oral suspension comprising 25 mg of dl-2,3,5,6-tetrahydro-6-phenylimidazo[2,1-b]thiazole as the active ingredient per teaspoonful (5 mls.):

| | Grams |
|---|---|
| A.I | 25.0 |
| Sucrose | 300.0 |
| Dioctyl sodium sulfosuccinate | 0.5 |
| Bentonite | 22.5 |
| Methyl paraben | 7.5 |
| Propyl paraben | 1.5 |
| Antifoam A.F. Emulsion | 0.15 |
| Propylene glycol | 52.0 |
| FD&C Yellow No. 5 | 0.1 |
| Sodium cyclamate | 50.0 |
| Sodium saccharin | 5.0 |
| Orange flavor | 7.5 |
| Filtered purified water, q.s., ad 5 liters | |

Dissolve the parabens in the propylene glycol and add this solution to a solution of the sodium cyclamate, sodium saccharin and sucrose in half the water. Suspend the bentonite in hot (about 85°C.) water and stir for 60 minutes. Add the bentonite solution to the former solution.

Dissolve the sulfosuccinate in some water and suspend the A.I. in the resulting solution. Add the Antifoam A.F. Emulsion which has been diluted to a lotion consistency with a minimum amount of water and mix well.

Add the latter suspension of A.I. to the former mixture and mix well. Add the FD&C Yellow No. 5 dissolved in a small amount of water. Add the orange flavor, q.s. to volume with water, and stir to a homogeneous mixture. Pass the mixture through a colloid mill and fill into suitable containers.

Injectable Suspension

The following formulation provides 1 liter of a parenteral suspension comprising 5 mg of dl-2,3,5,6-tetrahydro-6-phenylimidazo[2,1-b]thiazole as the active ingredient per milliliter:

| | Grams |
|---|---|
| A.I. | 5.0 |
| Polysorbate 80 | 2.0 |
| Sodium chloride | 9.0 |
| Sodium carboxymethyl cellulose | 10.0 |
| Methyl paraben | 1.8 |
| Propyl paraben | 0.2 |
| Water for Injection, U.S.P., q.s. ad 1 liter | |

Dissolve the parabens, sodium chloride and carboxymethyl cellulose in ½ the total volume of water by heating to 95°C. to obtain a clear solution. Filter and autoclave. Dissolve the polysorbate in ⅓ the total volume of water. Filter and autoclave this second solution. Add sterile A.I. to the second solution and pass through a sterile colloid mill. To the resulting suspension, add the first solution with uniform stirring. Q.s. with water and stir while filling into sterile vials.

Suppository

Ten suppositories, each containing 200 mg of dextro-2,3,5,6-tetrahydro-6-phenylimidazo[2,1-b]thiazole hydrochloride are prepared from the following formulation:

| | Grams |
|---|---|
| A.I. (powdered) | 2.0 |
| Theobroma oil | 20.0 |

Shred or grate the theobrama oil. Pulverize the A.I. and pour on top of the grated theobroma oil in a mortar and stir with spatula until fairly well mixed. Then grind the mixture with a pestle until a mass is formed and cut and shape into suppositories.

Capsules 10,000 hard gelatin capsules each containing 50 mg of 2,3,5,6-tetrahydro-6-phenylimidazo[2,1-b]thiazole or the hydrochloride salt thereof as the active ingredient are prepared according to the following formula. These ingredients are intimately mixed together and placed into two-piece gelatin capsules.

| | Grams |
|---|---|
| A.I. | 500 |
| Lactose | 500 |
| Talc | 150 |
| Starch | 150 |
| Calcium Stearate | 10 |

Tablets 5,000 compressed tablets containing as the active ingredient 50 mg of 2,3,5,6-tetrahydro-6-phenylimidazo[2,1-b]thiazole or a salt thereof as the active ingredient are prepared according to the following formula. The ingredients in fine powder are mixed and granulated with 10% starchpaste. The granules are dried and compressed into tablets.

| | Grams |
|---|---|
| A.I. | 250 |
| Starch | 75 |
| Dibasic Aqueous Calcium-phosphate | 325 |
| Calcium Stearate | 3.5 |

What is claimed is:

1. The method of relieving depression which comprises internally administering to a depressed mammal an effective anti-depressant amount of a member selected from the group consisting of the racemic, dextro and levo form of 2,3,5,6-tetrahydro-6-phenylimidazo[2,1-b]thiazole and the therapeutically active acid addition salts thereof as an active ingredient in admixture with a pharmaceutically acceptable carrier.

2. The method of relieving depression which comprises internally administering to a depressed mammal a pharmaceutical composition in dosage unit form comprising per dosage unit from about 5 to about 500 mg of a member selected from the group consisting of the racemic, dextro and levo form of 2,3,5,6-tetrahydro-6-phenylimidazo[2,1-b]thiazole and the therapeutically active acid addition salts thereof as an active ingredient in admixture with a pharmaceutically acceptable carrier.

3. The method of claim 2 wherein said active ingredient is dl-2,3,5,6-tetrahydro-6-phenylimidazo[2,1-b]thiazole hydrochloride.

4. The method of claim 2 wherein said active ingredient is levo-2,3,5,6-tetrohydro-6-phenylimidazo[2,1-b]thiazole hydrochloride.

5. The method of claim 2 wherein said active ingredient is dextro-2,3,5,6-tetrahydro-6-phenylimidazo[2,1-b]thiazole hydrochloride.

* * * * *

PO-1050
(5/69)

UNITED STATES PATENT OFFICE
CERTIFICATE OF CORRECTION

Patent No. 3,852,458    Dated December 3, 1974

Inventor(s) Paul Adriaan Jan Janssen

It is certified that error appears in the above-identified patent and that said Letters Patent are hereby corrected as shown below:

First page of patent, after [21] line:

Insert the following --
            FOREIGN APPLICATION PRIORITY DATA
    August 11, 1972     Belgium ........ 120,925

In Column 1, line 23, "levamisole. should read --- "levamisole." ---.

In Column 3, line 35, "in" should read --- is ---.

In Table 4, #9: "↑↑ should read --- ↑↑↑ ---.

In Column 5, line 56, "or" should read --- of ---.

In Column 9, line 5, "tetrohydro" should read --- tetrahydro ---.

Signed and sealed this 24th day of June 1975.

(SEAL)
Attest:

RUTH C. MASON
Attesting Officer

C. MARSHALL DANN
Commissioner of Patents
and Trademarks